Sept. 9, 1952     W. R. ISOM ET AL     2,609,725
VARIABLE LIGHT INTERRUPTING SHUTTER Filed Aug. 28, 1948     4 Sheets-Sheet 1

WARREN R. ISOM &
DALLAS R. ANDREWS
INVENTORS.

BY *Orl R. Goshaw*

ATTORNEY

Sept. 9, 1952 W. R. ISOM ET AL 2,609,725
VARIABLE LIGHT INTERRUPTING SHUTTER
Filed Aug. 28, 1948 4 Sheets-Sheet 2
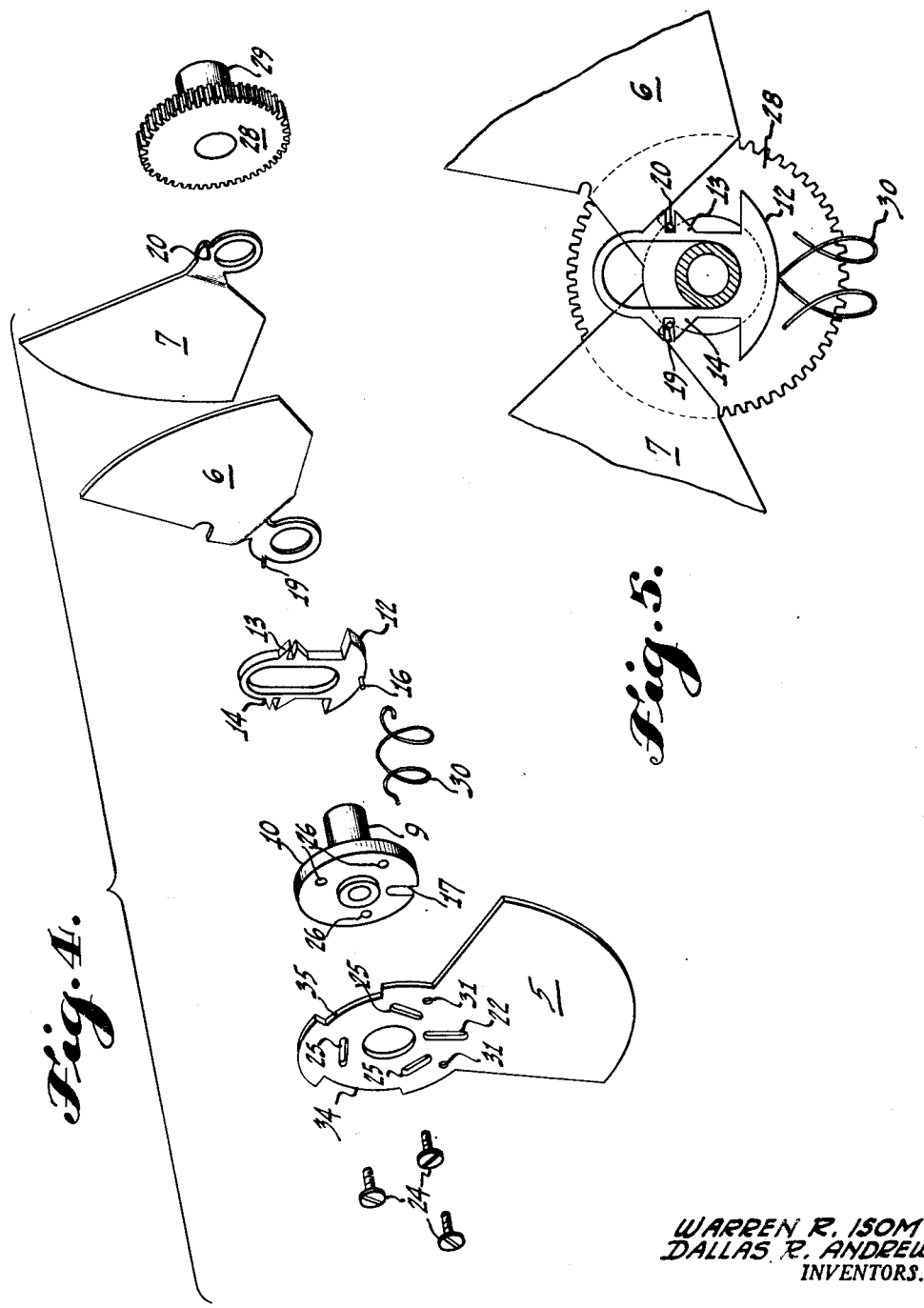
WARREN R. ISOM &
DALLAS R. ANDREWS
INVENTORS.
BY
ATTORNEY Sept. 9, 1952 W. R. ISOM ET AL 2,609,725
VARIABLE LIGHT INTERRUPTING SHUTTER
Filed Aug. 28, 1948 4 Sheets-Sheet 3

WARREN R. ISOM &
DALLAS R. ANDREWS
INVENTORS.

BY *Vrl R. Gochaw*

ATTORNEY.

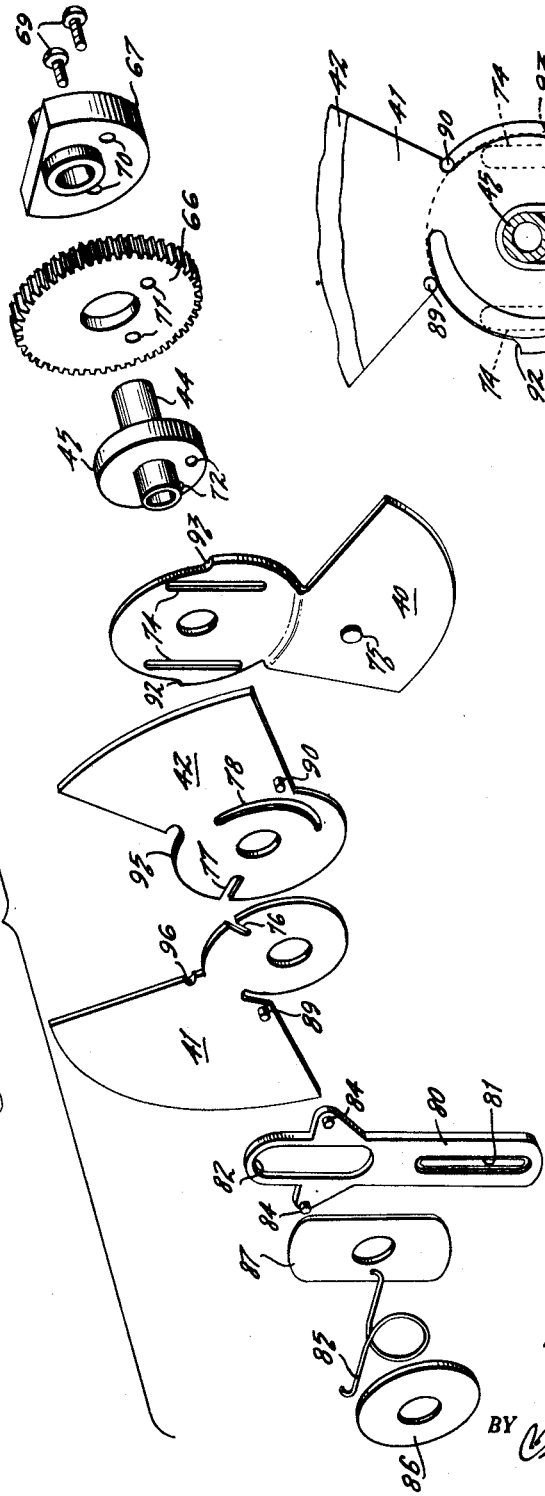

Patented Sept. 9, 1952

2,609,725

UNITED STATES PATENT OFFICE 2,609,725

VARIABLE LIGHT INTERRUPTING SHUTTER

Warren R. Isom, West Collingswood, and Dallas R. Andrews, Collingswood, N. J., assignors to Radio Corporation of America, a corporation of Delaware Application August 28, 1948, Serial No. 46,668

5 Claims. (Cl. 88—19.4)

This invention relates to light interruption shutters for motion picture projectors, and particularly for sixteen millimeter film projectors adapted to operate at both silent and sound film speeds; namely, at sixteen frames per second, and at twenty-four frames per second, respectively.

In the projection of motion pictures, two factors are important, such as (1) maximum uniform brightness on the observing screen, and (2) elimination of light flicker. Since silent film is shown at the rate of sixteen frames per second, a three-blade shutter is generally used so that the machine will not produce a flicker frequency of less than the established minimum of forty-eight cycles per second. However, with respect to maximum illumination of the screen, a three-blade shutter is not as efficient as a two-blade shutter. Now, since sound film is projected at the rate of twenty-four frames per second, a two-blade shutter may be used to obtain maximum screen brightness and still provide a flicker frequency of not less than forty-eight cycles per second. If a three-blade shutter is used at sound film speed, the amount of time that light can pass to the screen will be approximately two-thirds of the time that light can pass through a two-blade shutter. This approximate ratio is true for a shutter with blades having a nominal width of seventy-two-and-one-half degrees.

The present invention is directed to a shutter mechanism which will automatically shift from a three-blade shutter form to a two-blade shutter form when the rotation thereof is advanced from 960 revolutions per minute, or silent film speed, to 1440 revolutions per minute, or sound film speed and vice versa. Thus, maximum efficiency is obtained at both speeds with standard flicker frequency, and, although slightly less brightness at silent speed is obtained, this is not regarded as serious, since most of the films projected for large audiences have sound.

The invention is made to occupy a small space, all moving parts are under spring tension in both running positions to eliminate noise and rattle, and the shutter remains in full static balance in both operating positions. The use of a weight in connection with the shifting of shutter blades is known in the art and evidenced by U. S. Patent No. 2,349,500 of May 23, 1944, but the present invention is an improvement thereover in several respects.

The principal object of the invention, therefore, is to facilitate the projection of motion pictures, particularly when the same projector is used for both silent and sound films.

Another object of the invention is to provide an improved motion picture shutter which automatically shifts from a three to a two-blade form and vice versa, with the change in the rate of picture projection.

A further object of the invention is to provide an improved motion picture shutter which will automatically shift blade positions, which occupies a small space, which provides balanced operation in all positions, and which provides the established minimum flicker frequency at both speeds of operation.

Although the novel features which are believed to be characteristic of this invention will be pointed out with particularity in the appended claims, the manner of its organization and the mode of its operation wil be better understood by referring to the following description read in conjunction with the accompanying drawings, forming a part hereof, in which:

Fig. 4 is an exploded view of the modification of the shutter shown in Figs. 1 and 2.

Fig. 5 is a partial view taken along the line 5—5 of Fig. 3.

Fig. 9 is an exploded view of the modification shown in Fig. 6, and

Fig. 10 is a partial view taken along the line 10—10 of Fig. 8.

Figure 1:
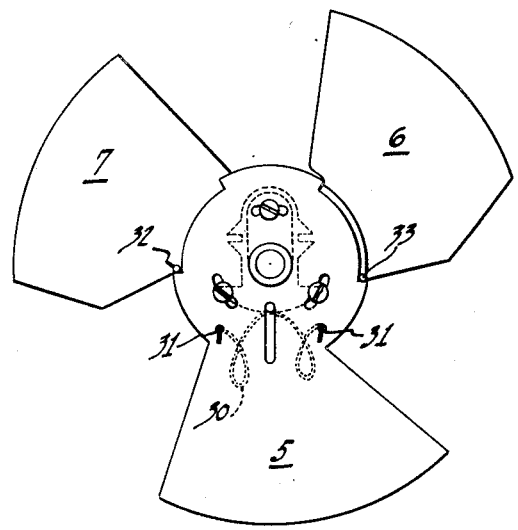
Fig. 1 is a front, elevational view showing one modification of the mechanism of the invention in three-blade position.

Referring now to the drawings, in which the same numerals identify like elements, and particularly referring to Figs. 1 to 5, inclusive, the shutter of this modification has a cover blade 5 and interrupter blades 6 and 7, interrupter blade 6 having a certain portion of its leading edge removed, and interrupter blade 7 having a portion of its trailing edge removed, as disclosed and claimed in copending application, Ser. No. 45,303, filed August 20, 1948. The three blades 5, 6, and 7 are adapted to be mounted on a shaft 9, the cover blade 5 being fixedly mounted on one side of the collar 10, and the blades 6 and 7 being mounted for limited rotation on the shaft 9 on the other side of collar 10.

By reference to Fig. 4, the method of assembling and the relative positions of the various elements of the shutter are shown. A sliding weight 12 has a curved head and notched ears 13 and 14 and a pin 16, the weight being adapted to be positioned on the shaft 9 between the blade 6 and collar 10. The pin 16 is adapted to pass through a radial notch 17 in the collar 10, and the projections or ears 19 and 20 of blades 6 and 7 are adapted to be inserted in the notches of the ears 13 and 14. The pin 16 also passes through an elongated slot 22 in the cover blade 5, this blade being fixedly attached to the collar 10 by means of screws 24 passing through curved slots 25 and into threaded holes 26 in the collar 10. The slots 25 are for the purpose of adjusting the cover blade 5 with respect to blades 6 and 7 to provide minimum "ghost" effect.

Figure 3:
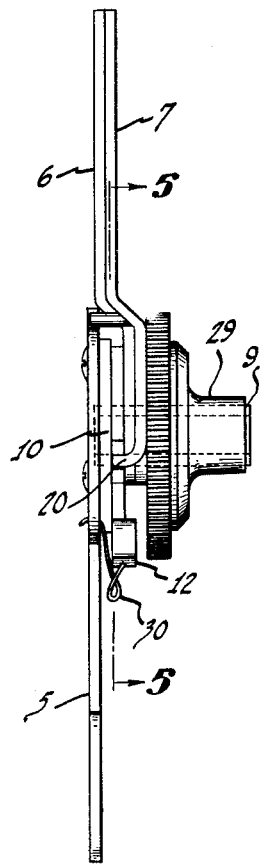
Fig. 3 is a side view of the shutter modification shown in Figs. 1 and 2.

After the sliding weight 12 and blades 6 and 7 are arranged on the shaft 9, gear 28 is attached to the shaft, in any suitable manner, such as by a set screw in its sleeve 29. Another element shown particularly in Figs. 3 and 5, is a W-shaped wire spring 30 having its ends hooked into holes 31 in the cover blade and its center point attached to the mid-point of the arc of the head of the weight 12.

Figure 2:
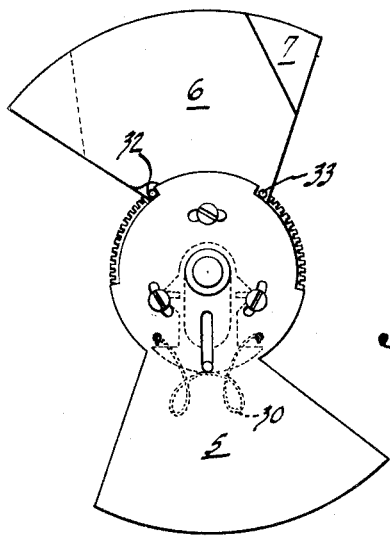
Fig. 2 is a front, elevational view of the same shutter of Fig. 1 in two-blade position.

The above shutter operates by centrifugal force acting on the blades and particularly on the weight 12. That is, as the weight 12 is moved radially from the shaft 9 by centrifugal force, the interrupter blades 6 and 7 are pulled together to an overlapping position, as shown in Fig. 2, overcoming the spring tension in spring 30. They are pulled together by the projections 19 and 20 in the slots of ears 13 and 14 being moved with the weight, thus rotating the blades 6 and 7 in opposite directions on the shaft 9. Furthermore, the shifting of the weight 12 balances the shutter in its two-blade position, the weight also balancing the shutter when it is in the position shown in Figs. 1 and 5, or three-blade position.

The centrifugal force on a rotating mass W is equal to $WR(2\pi n)^2$, where $n$ is the revolutions per second and $R$ is the radius to the center of gravity, this force being increased not only by the increase in speed, but also by the increased radius. This results in an effect which makes the change occur with a snap and with a surplus force to hold the blades in their new position, this action being advantageous. Thus, although this effect increases to some extent the difference between the speed at which the weight moves out and the speed to which it is necessary to slow down in order to make it move back, there is sufficient difference between 960 and 1440 revolutions per minute to provide a comfortable margin. To maintain this margin, friction is reduced to minimum. It will be noted that the spring action is exerted against the weight not only in the three-blade position, shown in Figs. 1 and 5, but also in the two-blade position, shown in Fig. 2. This prevents noise and rattle during operation of the shutter. Furthermore, as shown in Fig. 2, the interrupter blades, when in the two-blade position, provide the same shape of blade as the cover blade, the position of the blades 6 and 7 being controlled by the stop pins 32 and 33 abutting the shoulders of notches 34 and 35 in the cover blade. The pin 16 maintains the movement of the weight 12 in a fixed radial position.

There is thus provided a shutter which automatically transforms itself from a three-blade to a two-blade shutter when the projector is operated at sound film speed and automatically shifts back to a three-blade shutter when the projector is operated at silent film speed.

Referring now to a second modification, in which a type of shutter is provided wherein friction is reduced during actuation of the blade and a more positive action and balance is obtainable, a cover blade 40 is provided along with interrupter blades 41 and 42. This shutter construction has a shaft 44 similar to shaft 9 of the first modification and on which there is a collar 45. In this instance, however, all the blades and the weight are mounted on one side of the collar 45 and a gear 66 with a mounting collar and shaft 67 are provided on the other side of the collar 45. The collar 67 and gear 66 are attached to the collar 45 on the shaft 44 by means of screws 69 passing through holes 70 and 71 and threaded into holes 72.

Figure 6:
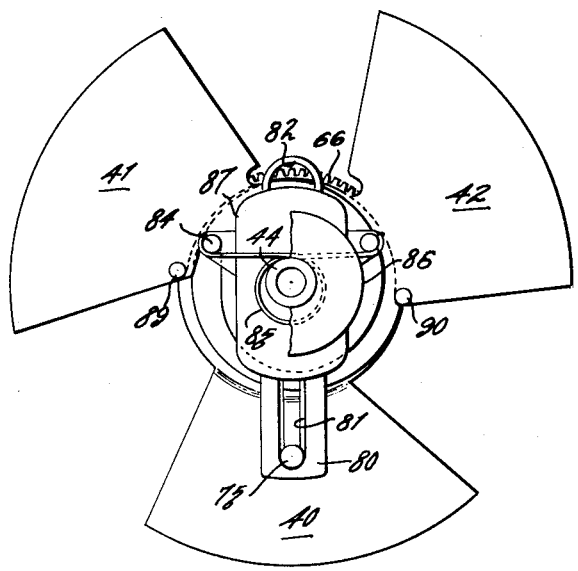
Fig. 6 is a front, elevational view of another modification of the mechanism of the invention in three-blade position.
Figure 8:
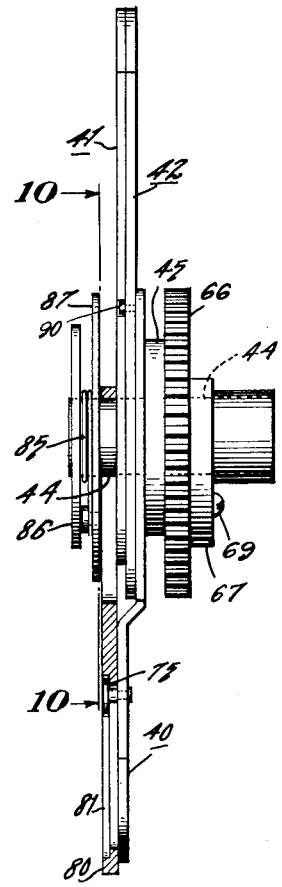
Fig. 8 is a side view of the modification of the invention shown in Figs. 6 and 7.

In this second modification, the cover blade 40 has a pair of parallel slots 74 and a pin 75, blade 41 has a radial slot 76, and blade 42 has a radial slot 77 and a curve slot 78. The weight which shifts the blades and balances the shutter in both positions is shown at 80 and has an elongated slot 81 in which the pin 75 is positioned and a slot 82 which passes over shaft 44. The weight has two pins 84 passing through the ends of the T of the weight on which the ends of a wire spring 85 bear, the spring being wrapped around the shaft 44. The other ends of pins 84 are positioned in the parallel slots 74 and in the radial slots 76 and 77, one of the pins 84 passing through the curved slot 78 in order to be positioned in one of the parallel slots 74. Positioned between the weight 80 and a fastening collar or washer 86 is a shim 87 which permits the weight to slide with the minimum of friction between its two positions controlled by the length of slot 82. Stop pins 89 and 90 on interrupter blades 41 and 42, respectively, are adapted to fit into notches 92 and 93 on cover blade 40 when the shutter is three-bladed, as shown in Fig. 6, and to fit in notches 95 and 96 when the shutter is two-bladed, as shown in Fig. 7.

Figure 7:
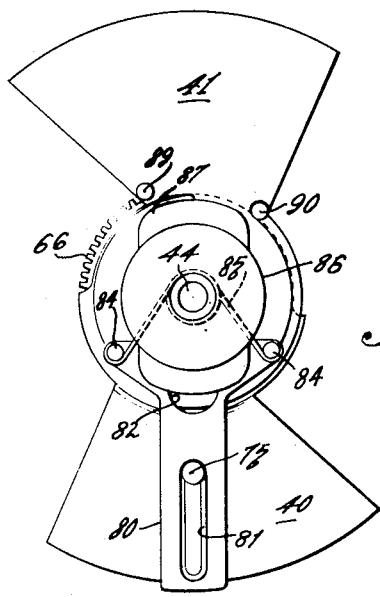
Fig. 7 is a front, elevational view of the modification shown in Fig. 6 in two-blade position.

The operation of the modification shown in Figs. 6 to 10, inclusive, is similar to that in the first described modification, in that the weight 80 overcomes the tension of the spring 85 to pull the two blades 41 and 42 to overlapping position, as shown in Figs. 7 and 10, the pins 84 rotating the blades 41 and 42 toward each other on shaft 44. The shifting of the weight also balances the shutter in its two operating positions to prevent vibration of the projector and to provide uniform rotation. With an elongated weight such as 80, a better distribution of the weight radially from the shaft 44 is obtained. Furthermore, the spring 85 exerts a force on the shiftable elements at all times, thus eliminating noise and rattle in the shutter mechanism.

Both modifications provide a desired flicker frequency of forty-eight cycles per second in both operating positions of the mechanisms, an increase of light at sound film speed, automatic control of the shift from one position to the other, and a uniform screen brightness at both operating speeds. Although the invention has been described as providing an automatic shift, it is to be understood that it could be accomplished by mechanical or electrical means at the time the projector is shifted from one speed to another.

We claim:

1. A shutter mechanism comprising a shaft, three blades on said shaft, one of said blades being fixed to said shaft and the other of said blades being rotatable with respect to said shaft to both overlapping and non-overlapping positions, a weight member having an offset slotted portion encircling said shaft, means associated with said fixed blade for guiding the radial movement of said member, means interconnecting said rotatable blades with said weight member, said means including pin and slot connections between said rotatable blades and said weight member, and tensioning means for biasing said weight member toward the axis of said shaft, said weight element rotating said rotatable blades to overlapping position at a predetermined speed of rotation of said shaft, said shutter mechanism being balanced when said rotatable blades are in both said overlapping position and in said non-overlapping position.

2. A shutter mechanism in accordance with claim 1, in which said guiding means includes a pin on said weight member and a slot in said blade fixed to said shaft, said pin being positioned and slidable in said slot.

3. A shutter mechanism in accordance with claim 1, in which said pin and slot connections include pins on said rotatable blades and notches in the offset slotted portion of said weight member, said pins being positioned in said slots.

4. A shutter mechanism in accordance with claim 1, in which said guiding means includes a pin on said blade fixed to said shaft and a slot in said weight member, said pin being positioned and slidable in said slot.

5. A shutter mechanism in accordance with claim 1, in which said pin and slot connections include pins on said offset slotted portion of said weight member and a slot in each of said rotatable blades in which said pins are positioned.

WARREN R. ISOM.
DALLAS R. ANDREWS.

REFERENCES CITED

The following references are of record in the file of this patent:

UNITED STATES PATENTS

| Number | Name | Date |
|---|---|---|
| 1,464,472 | Gibbs et al. | Aug. 7, 1923 |
| 1,700,513 | Porter | Jan. 29, 1929 |
| 1,965,366 | Brown | July 3, 1934 |
| 2,106,115 | Debrie | Jan. 18, 1938 |
| 2,349,500 | Howell | May 23, 1944 |
| 2,379,129 | Wurger | June 26, 1945 |